(12) United States Patent
Poonawala et al.

(10) Patent No.: US 12,330,731 B2
(45) Date of Patent: Jun. 17, 2025

(54) STEERING AXLE ARRANGEMENT

(71) Applicant: DANA ITALIA S.R.L., Trentino (IT)

(72) Inventors: Idris Poonawala, Pune (IN); Praveen Malvi, Pune (IN); Paresh Joshi, Pune (IN)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/169,670

(22) Filed: Feb. 15, 2023

(65) Prior Publication Data

US 2024/0270309 A1 Aug. 15, 2024

(51) Int. Cl.
*B62D 7/18* (2006.01)
*B62D 15/02* (2006.01)
*F16C 19/36* (2006.01)
*F16C 33/66* (2006.01)

(52) U.S. Cl.
CPC ............. *B62D 7/18* (2013.01); *B62D 15/023* (2013.01); *F16C 19/364* (2013.01); *F16C 33/6622* (2013.01); F16C 2326/24 (2013.01)

(58) Field of Classification Search
CPC ....... B62D 7/18; B62D 15/023; F16C 19/364; F16C 33/6622; F16C 2326/24
See application file for complete search history.

(56) References Cited

U.S. PATENT DOCUMENTS

| 6,827,359 | B2 | 12/2004 | Barila |
| 7,093,843 | B2 | 8/2006 | Varela et al. |
| 7,204,341 | B2 | 4/2007 | Lundmark |
| 7,740,253 | B2 | 6/2010 | Ziech |
| 8,764,034 | B2 | 7/2014 | Wells et al. |
| 9,869,346 | B2 | 1/2018 | Murray et al. |
| 10,766,531 | B2 | 9/2020 | Jensen et al. |
| 2004/0227319 | A1* | 11/2004 | Varela ........................ B62D 7/18 280/93.512 |
| 2014/0035247 | A1* | 2/2014 | Wells ......................... B62D 7/18 280/93.512 |
| 2020/0070885 | A1* | 3/2020 | Jensen .................... B62D 15/02 |

FOREIGN PATENT DOCUMENTS

| CN | 111152606 A | * | 5/2020 | ........... B60B 35/003 |
| DE | 102004053743 A1 | * | 5/2006 | ........... B62D 15/023 |
| DE | 102007031321 A1 | * | 1/2009 | ............... B62D 7/18 |
| EP | 0201965 A2 | | 11/1986 | |
| WO | 2014101756 A1 | | 7/2014 | |

OTHER PUBLICATIONS

Bostancioglu et al. DE 10 2007 031321, Machine English Translation, ip.com (Year: 2007).*
Ji et al. CN 111152606 Machine English translation, ip.com (Year: 2020).*
Sigl et al. DE 10 2004 053743 Machine English translation, ip.com (Year: 2004).*

* cited by examiner

*Primary Examiner* — Karen Beck

(74) *Attorney, Agent, or Firm* — McCoy Russell LLP

(57) ABSTRACT

Methods and systems for an axle are described. The axle may be a steering axle that is coupled to wheels that may move to change a steering angle of a vehicle. In one example, the axle includes two bearings that are arranged similarly so as to reduce a height of an axle. The two bearings may be tapered wheel bearings so that vertical and lateral wheel loads may be supported via an actual total of two bearings per wheel.

14 Claims, 6 Drawing Sheets

STEERING AXLE ARRANGEMENT

TECHNICAL FIELD

The present disclosure relates to an axle of a vehicle. The axle may be a steering axle that supports rotational motion of wheels about coupling pins to facilitate steering of a vehicle.

BACKGROUND AND SUMMARY

A vehicle may include an axle that is coupled to a right wheel and a left wheel. The axle may operate to support the vehicle's weight. Additionally, the axle may be a steering axle that allows the left and right wheels to move relative to the axle so that the vehicle may negotiate turns. The steering axle may include an axle housing or body that is mechanically coupled to left and right steering knuckles. The steering knuckles may be mechanically coupled to vehicle wheels. One way to attach a steering knuckle to an axle body is via a king pin. The king pin may pass through a first portion of the axle body, through the steering knuckle, and through a second portion of the axle body to secure the steering knuckle to the axle body. The steering knuckle may oscillate about the king pin to steer the vehicle. However, the king pin fastening mechanism may increase a vertical dimension of the axle arrangement, thereby limiting the rim diameter that can be used to a certain minimum diameter. To make this arrangement compact for accommodating smaller rim diameters, certain arrangements can be used, but with these arrangements mounting a steering sensor becomes unfeasible.

The inventors have recognized the aforementioned challenges and developed an axle, comprising: an axle body: a steering knuckle assembly; a top bearing directly coupled to the axle body; a bottom bearing directly coupled to the steering knuckle assembly; a top pin that rotates as the steering knuckle assembly moves, the top pin configured to couple the axle body to the steering knuckle assembly; and a bottom pin that is stationary as the steering knuckle assembly moves, the bottom pin configured to couple the axle body to the steering knuckle assembly. The bearings are mounted in a tandem arrangement such that both bearings have the small side of their cone facing upwards.

By fabricating an axle assembly that includes an axle body, a steering knuckle assembly, a top bearing directly coupled to an axle body, a bottom bearing directly coupled to the knuckle assembly, a top pin that rotates as the steering knuckle assembly moves, the upper pin configured to couple the axle body to the steering knuckle assembly, and a bottom pin that is stationary as the steering knuckle moves, the bottom pin configured to couple the axle body to the steering knuckle assembly, it may be possible to reduce an overall height of an axle assembly so that a smaller rim can be used in the vehicle. Additionally, the axle assembly may report an angle to a vehicle controller via a sensor that monitors rotation of the top pin relative to the axle body so that a vehicle steering angle may be determined.

The axle assembly and method described herein may provide several advantages. One advantage may be to reduce axle height. Further, the axle assembly is structured so that a steering angle may be readily determined. Further still, the axle assembly includes few components so that it may provide reliable operation and lower manufacturing expenses.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
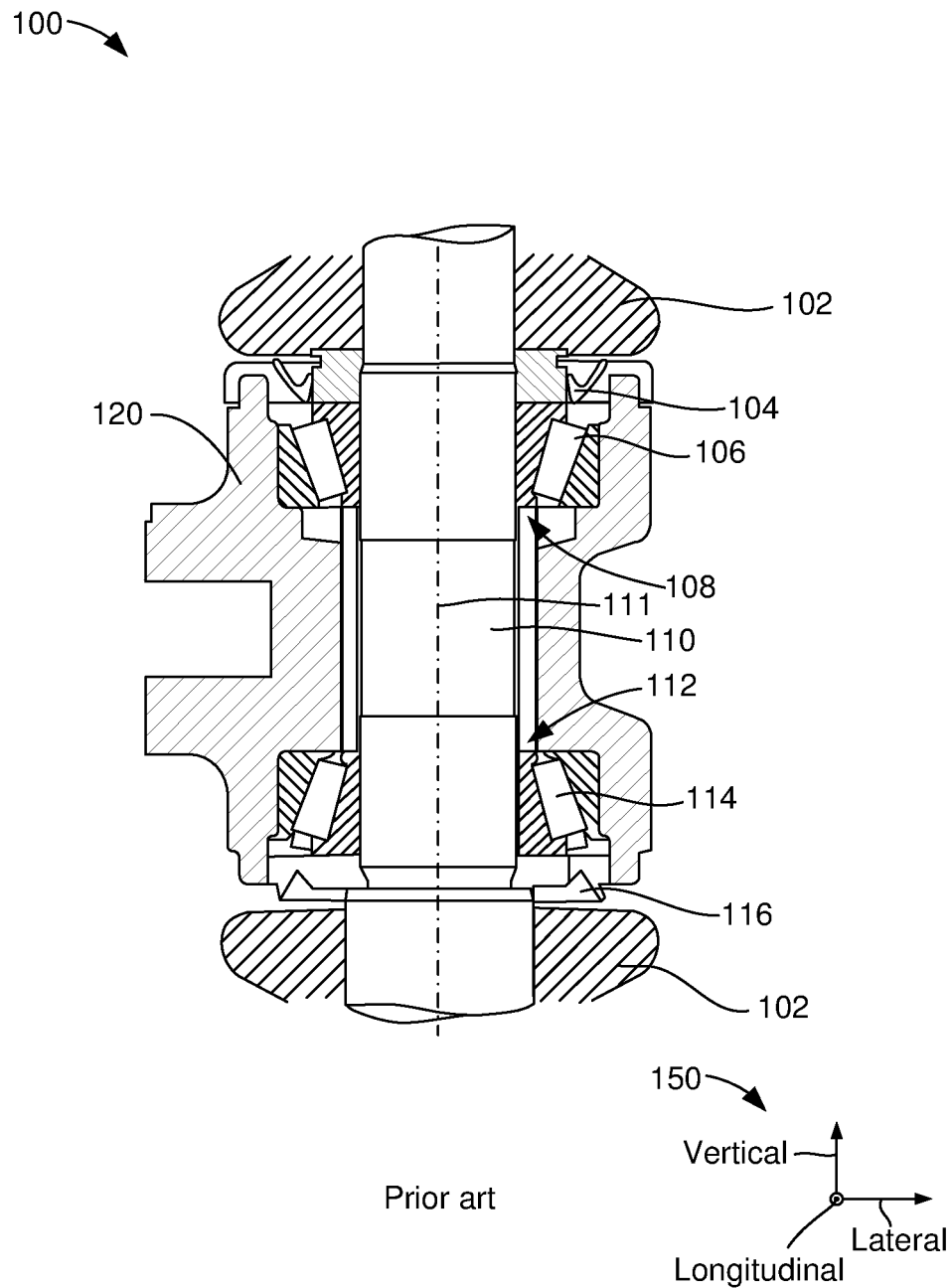
FIG. 1 is a cross section of an example prior art axle assembly.
Figure 4:
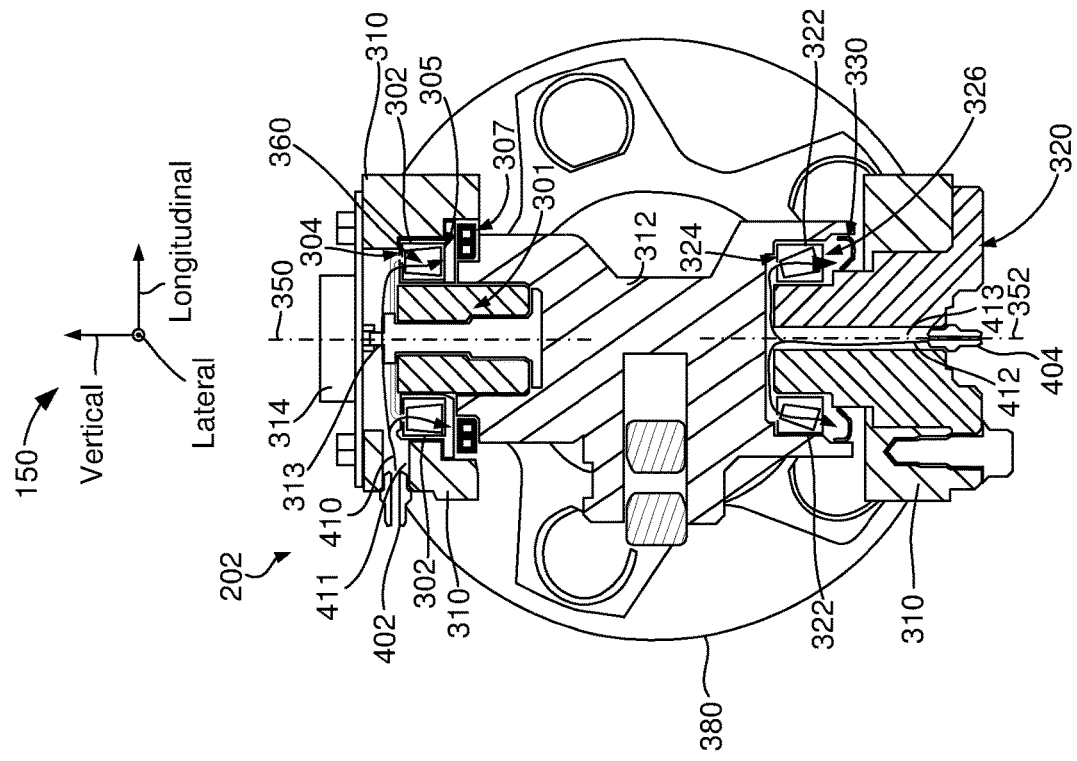
FIG. 4 is a side cross-sectional view a portion of an axle assembly.
Figure 3:
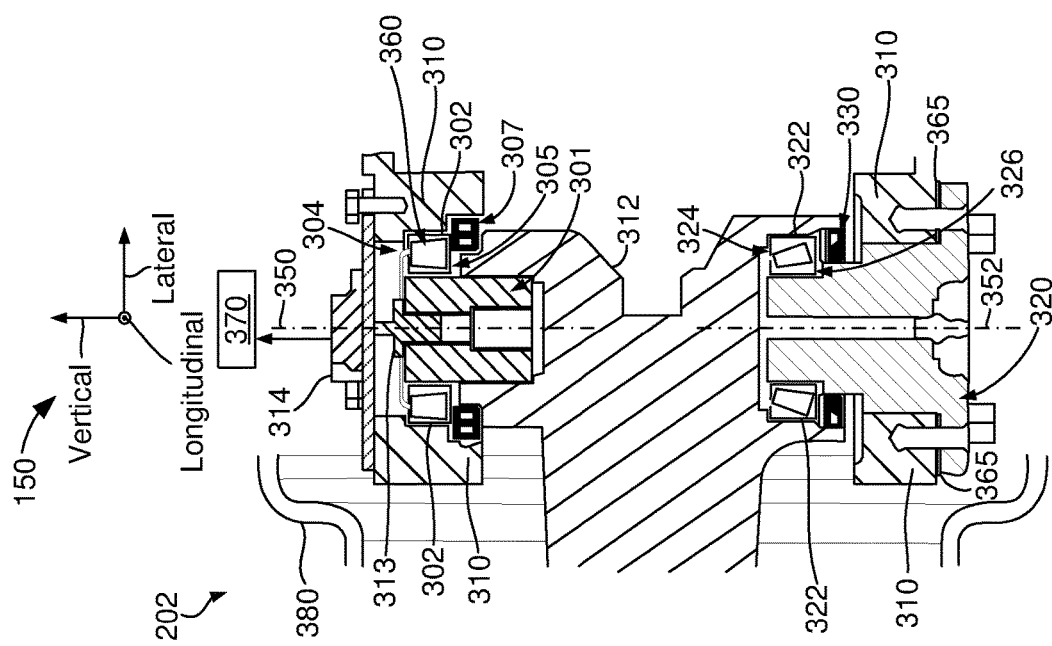
FIG. 3 is a front cross-sectional view of a portion of an axle assembly.
Figure 5:
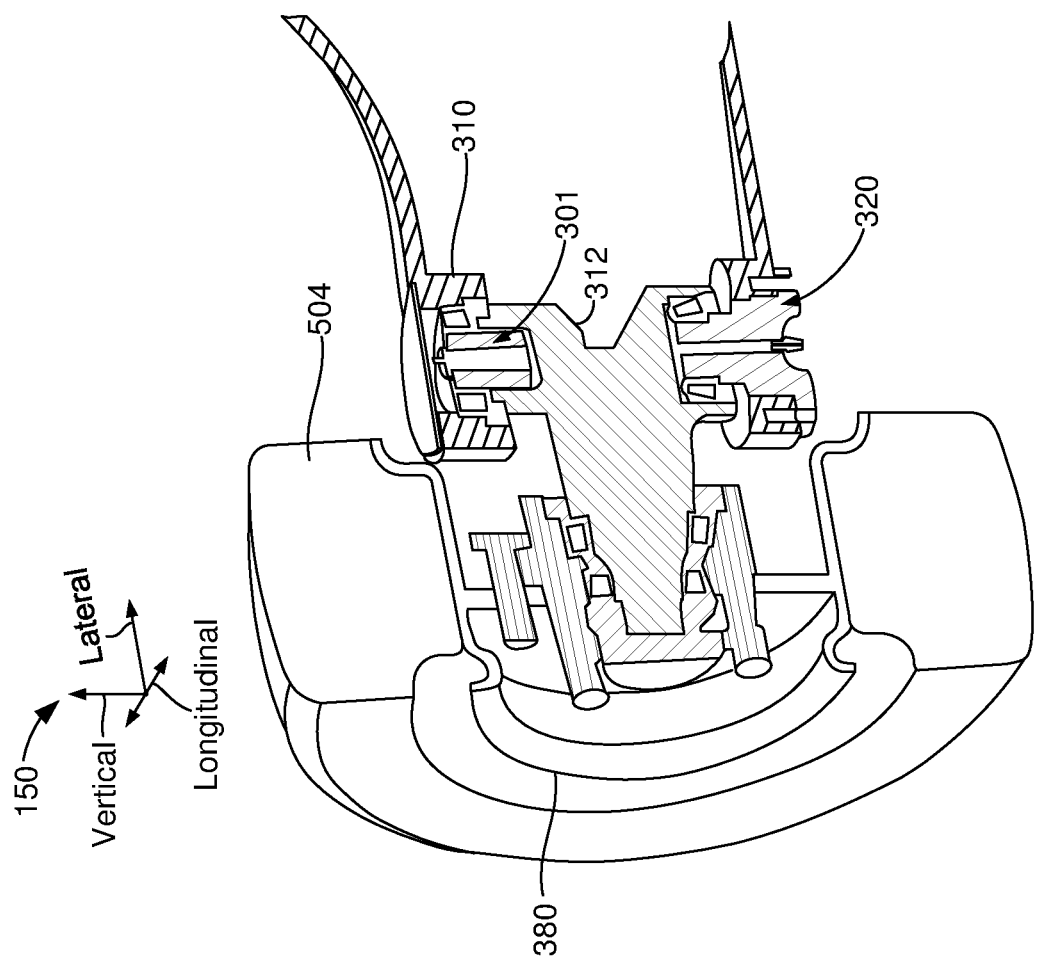
FIG. 5 is a cross-sectional view of an axle assembly and wheel.
Figure 7:
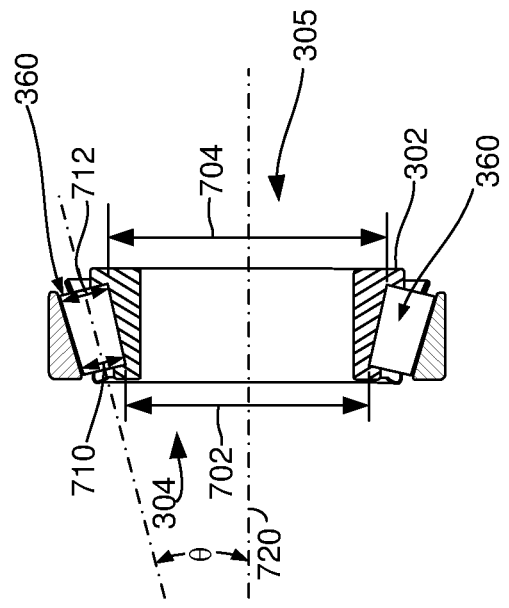
FIGS. 6 and 7 show views of an example tapered roller bearing.
Figure 6:
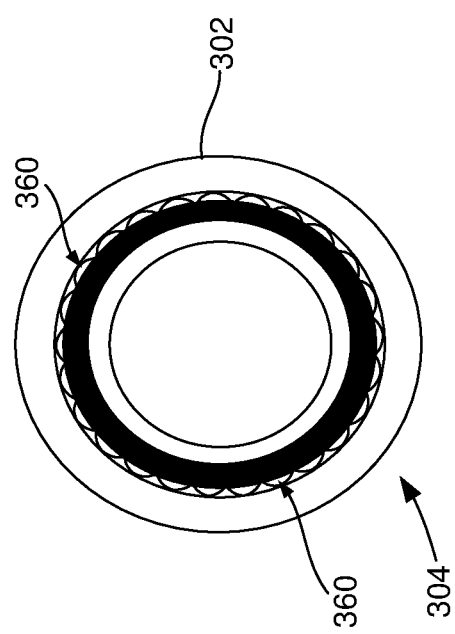
Figure 8:
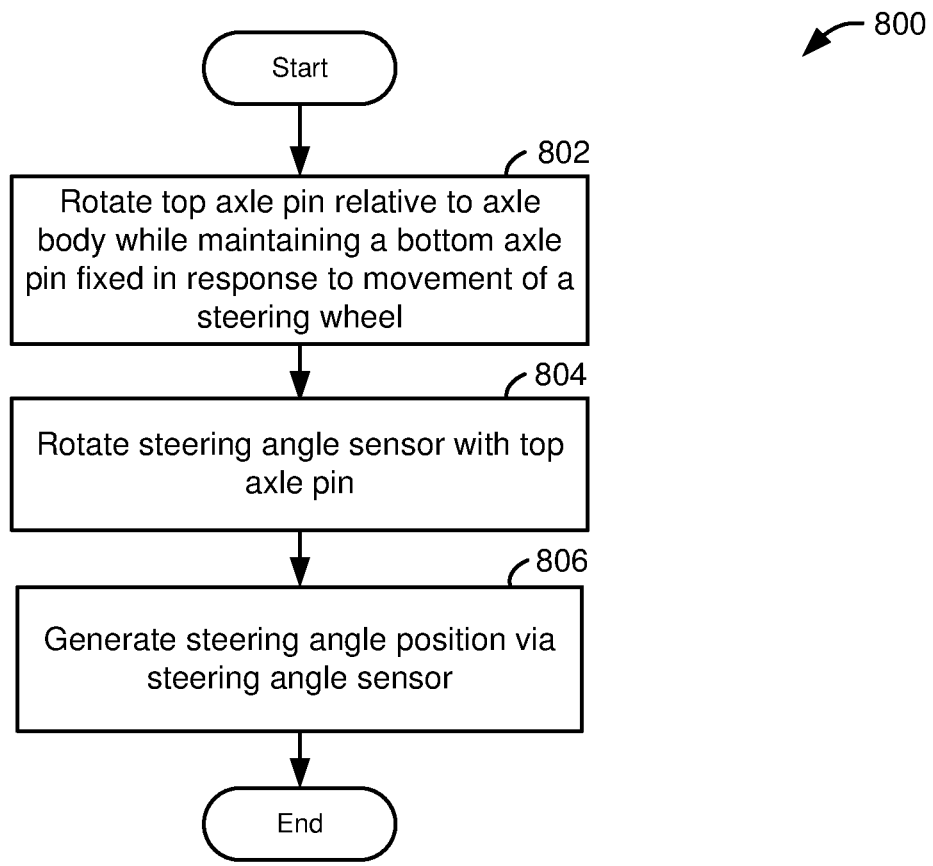
FIG. 8 is a method for an axle assembly.

An axle arrangement disclosed herein may provide a lower profile axle assembly at low expense. Prior art axles, as shown in FIG. 1, may exhibit higher profiles and it may be more difficult to determine a steering angle from such axles. However, by placing a top roller bearing within an axle body and a bottom roller bearing within a steering knuckle assembly, where the top bearing and the bottom bearing are arranged face up, a lower profile axle may be fabricated as shown in FIGS. 3-5. Tapered roller bearings as shown in FIGS. 6 and 7 may handle vertical and lateral loads so that fewer bearings may be included in the low profile axle design. A method for a lower profile axle is shown in FIG. 8.

FIGS. 1-7 are drawn approximately to scale. However, the axle described herein may have other relative component dimensions in alternate embodiments.

FIG. 1 shows a cross-sectional view of a prior art axle assembly is shown. Axle 100 includes a king pin 110. The longitudinal axis 111 of king pin 110 is oriented in a vertical direction according to an axis 150 of a vehicle in which king pin 110 resides. Axle 100 includes a top bearing 106 (e.g., also known as an upper bearing) that is pressed into steering knuckle 120. A face 108 of top bearing 106 is oriented downward and toward a face 112 of bottom bearing 114 (e.g., also known as lower bearing). Bottom bearing 114 is pressed into steering knuckle 120. A face 112 of bottom bearing 114 is oriented upward and toward a face 108 of top bearing 106. King pin 110 passes through an upper portion of axle body 102, steering knuckle 120, and a lower portion of axle body 102. Upper seal 104 prevents grease from exiting top bearing 106. Lower seal 116 prevents grease from exiting bottom bearing 114. Steering knuckle 120 may rotate about king pin 110 when a vehicle (not shown) is turning. King pin 110 is fixed with respect to axle body 102.

Figure 2:
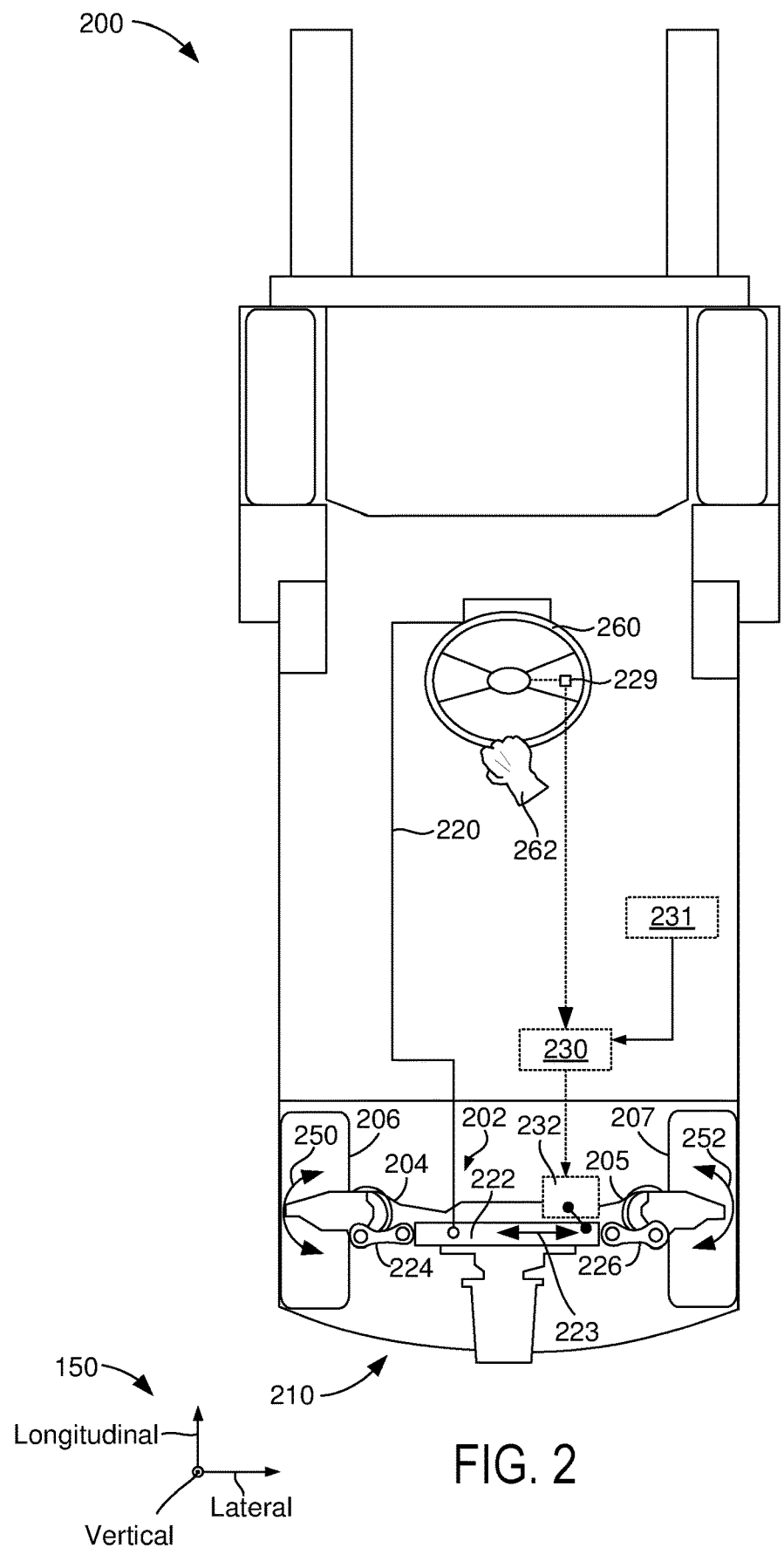
FIG. 2 shows a plan view of a vehicle that includes an axle assembly of the type disclosed herein.

Referring now to FIG. 2, a plan view of an example vehicle in which an axle of the type described herein is shown. In this example, vehicle 200 is a forklift with a steering axle 202 that is arranged on a rear side 210 of vehicle 200. Left side of steering axle 202 supports left wheel 206 and allows left wheel 206 to rotate, thereby allowing vehicle 200 to turn. Similarly, right side of steering axle 205 supports right wheel 207 and allows right wheel 207 to rotate, thereby allowing vehicle 200 to turn.

Right wheel 207 and left wheel 206 may rotate as indicated by arrows 250 and 252 in response to input to steering wheel 260. Steering wheel 260 may be adjusted via a human 262 and steering linkage 220 may translate motion of steering wheel 260 into motion of hydraulic cylinder 222. Hydraulic cylinder 222 may move linkage 224 and 226, which may cause steering knuckles (not shown, but shown in FIG. 3 as 312) to move so as to move left wheel 206 and right wheel 207 as indicated by arrows 250 and 252. Alternatively, a sensor 229 may send a steering wheel position signal based on a position of steering wheel 260 to a controller 230. Controller 230 may command an actuator 232. Actuator 232 may adjust a position of hydraulic cylinder as indicated by arrow 223 to adjust positions of right wheel 207 and left wheel 206. In still another example, an autonomous driver 231 may command controller 230 to adjust a position of right wheel 207 and left wheel 206.

Turning now to FIG. 3, a front cross-sectional view of a portion of a steering axle assembly 202 is shown. Steering axle assembly 202 is shown in its position relative to an axis 150 of a vehicle in which steering axle assembly 202 is placed. Longitudinal axis 350 of top pin 301 (e.g., also known as upper pin) runs in a vertical direction of the vehicle's axis 150.

Likewise, longitudinal axis 352 of bottom pin 320 (e.g., also know and lower pin) runs in a vertical direction of the vehicle's axis 150. Thus, top pin 301 is positioned above bottom pin 320 with respect to ground 399.

Top bearing 302 (e.g., also known as upper bearing) may be pressed into axle housing 310 and it is not part of steering knuckle 312. Rather, top pin 301 extends from top bearing 302 into steering knuckle 312 so that steering knuckle 312 may be supported via axle housing 310. Top pin 301 may be pressed into steering knuckle 312 so that top pin 301 rotates as steering knuckle 312 moves as a position of wheel 380 is adjusted via a steering linkage (not shown). Face 304 of top bearing 302 is oriented in an upward direction away from ground 399. Back 305 of top bearing 302 is oriented in a downward direction toward ground 399. Top bearing 302 may be a tapered roller bearing as shown in more detail in FIGS. 6 and 7. Rollers 360 of top bearing 302 may be tapered as shown in FIG. 7. Steering angle sensor 314 is mounted on the axle housing 310 and is fixed, the magnet 313 is coupled to the top pin 301 and it rotates with the knuckle 312. The sensor 314 and the magnet 313 together form the non-contact type Hall effect sensor and the relative position of the magnet 313 with respect to the sensor 314 provides the angle of the knuckle 312. The Steering angle sensor 314 may send a signal to controller 370 for controlling vehicle stability and other vehicle operations. Steering angle sensor 314 may output a signal (e.g., voltage, current, pulse, etc.). Steering angle sensor 314 may be a resistive, inductive, hall effect, or other known type of sensor. Bearing seal 307 helps to retain grease in top bearing 302.

Bottom bearing 322 (e.g., also known as lower bearing) may be pressed into steering knuckle 312 and it is not part of axle housing 310. Instead, bottom pin 320 extends from bottom bearing 322 into axle housing 310 so that steering knuckle 312 may be supported via axle housing 310. Bottom pin 320 may be bolted to the axle housing 310 so that bottom pin 320 does not rotate as steering knuckle 312 moves as a position of wheel 380 is adjusted via a steering linkage (not shown). Face 324 of bottom bearing 322 is oriented in an upward direction away from ground 399. Back 326 of bottom bearing 322 is oriented in a downward direction toward ground 399. Bottom bearing 322 may be a tapered roller bearing as shown in more detail in FIGS. 6 and 7. Rollers 360 of bottom bearing 322 may be tapered as shown in FIG. 7. Bearing seal 330 helps to retain grease in bottom bearing 322. The top bearing 302 and bottom bearing 322 may be preloaded via shims 365. Shims 365 are positioned between axle housing 310 and bottom pin 320. Shims 365 allow the bottom bearing 322 to press against steering knuckle 312, which in turn presses against top bearing 302 against axle housing 310, so that top bearing 302 and bottom bearing 322 are preloaded.

Thus, the faces of top bearing 302 and bottom bearing 322 are oriented in a same direction (e.g., upward) according to a vertical axis of a vehicle that includes the bearings. Further, top pin 301 rotates so that steering angle sensor 314 may send a signal to controller 370. Because top bearing 302 and bottom bearing 322 are oriented in a similar way, an overall height of the axle assembly may be shorter or smaller.

Moving on to FIG. 4, a side cross-sectional view of a portion of a steering axle assembly 202 is shown. The components shown in FIG. 4 that have the same numbers as components shown in FIG. 3 are the same components shown in FIG. 3. Therefore, for the sake of brevity, the description of these components will not be repeated.

FIG. 4 shows a top zerk grease fitting 402 (e.g., also known as upper zerk grease fitting) and a bottom zerk grease fitting 404 (e.g., also known as lower zerk grease fitting). Top zerk grease fitting 402 is coupled to axle housing 310 and passage 411 allows grease to flow in the direction of arrow 410. In particular, grease may flow into the face 304 of top bearing 302 and through top bearing 302 to the back 305 to top bearing 302 before exiting bearing seal 307. On the other hand, bottom zerk grease fitting 404 is directly coupled to bottom pin 320 and passage 413 allows grease to flow in the direction of arrow 412. In particular, grease may flow into the face 324 of bottom bearing 322 and through bottom bearing 322 to the back 326 to bottom bearing 322 before the grease exits bearing seal 330.

Thus, top zerk grease fitting 402 and bottom zerk grease fitting 404 allow grease to flow through top bearing 302 and bottom bearing 322, thereby providing better lubrication of the bearings. Further, old grease may be purged from the top bearing 302 and the bottom bearing 322 more effectively so that bearing wear may be reduced.

Referring now to FIG. 5, a cross-sectional area of a portion of axle housing 310 and a wheel 380 (e.g., half an axle assembly) is shown. Axle housing 310 is shown coupled to steering knuckle 312 via top pin 301 and bottom pin 320. The steering knuckle 312 is coupled to wheel 380, and tire 504 is coupled to wheel 380. Wheel 380 and tire 504 may pivot about top pin 301 and bottom pin 320. Wheel 380 may also rotate about steering knuckle 312. Axle housing 310 may include a second steering knuckle (not shown), top pin (not shown), bottom pin (not shown), to support a second wheel (not shown).

Referring now to FIGS. 6 and 7, a bottom bearing 322 (e.g., a roller bearing) is shown. In particular, FIG. 6 is a view looking at a face 304 of bottom bearing 322. In this example, bottom bearing 322 is a tapered roller bearing. In FIG. 6, ends of rollers 360 are shown. Top bearing 302 may be constructed similarly to bottom bearing 322.

FIG. 7 is a cross-sectional view of bottom bearing 322. Bottom bearing 322 includes a first dimension 702 (e.g., a diameter) between opposite rollers 360 that are arranged in a circle. Bottom bearing 322 also includes a second dimension 704 (e.g., a diameter) between opposite rollers 360 that are arranged in the circle. The first dimension is shorter or smaller than the second dimension. The second dimension 704 is closer to back 305 than the face 304 of bottom bearing 322. The first dimension 702 is closer to the face 304 than the back 305 of bottom bearing 322. Thus, the face 304 is on the side of the bearing with the shorter first dimension. In other words, the face of the bearing is on a side of the bearing where a small side of a cone is formed by the bearing rollers 360 being are placed on an angle θ with respect to a centerline 720 of the bearing 302.

The rollers 360 include a first dimension 710 of a diameter at one end of roller 360 and a second dimension 712 of a diameter at the other end of roller 360. The first dimension 710 is shorter or smaller than the second dimension 712 such that roller 360 is tapered. Tapered roller bearings may allow the axle to handle vertical and axial loads that are applied to the pins and bearings of the axle assembly.

Thus, FIGS. 2-7 provide for an axle, comprising: an axle body: a knuckle assembly; a top bearing directly coupled to the axle body; a bottom bearing directly coupled to the knuckle assembly; a top pin that rotates as the knuckle assembly moves, the top pin configured to couple the axle body to the knuckle assembly; and a bottom pin that is stationary as the knuckle assembly moves, the bottom pin configured to couple the axle body to the knuckle assembly. In a first example, the axle includes wherein the top bearing is assembled in the axle body. In a second example that may include the first example, the axle includes wherein the bottom bearing is assembled in the knuckle. In a third example that may include one or both of the first and second examples, the axle includes wherein the top bearing and the bottom bearing are tapered roller bearings. In a fourth example that may include one or more of the first through third examples, the axle further comprises a steering angle sensor coupled to the axle body. In a fifth example that may include one or more of the first through fourth examples, the axle further comprises a top grease zerk fitting coupled directly to the axle body. In a sixth example that may include one or more of the first through fifth examples, the axle further comprises a bottom grease zerk fitting coupled directly to the bottom pin.

The system of FIGS. 2-7 also provides for an axle, comprising: an axle body; a knuckle assembly; a top bearing directly coupled to the axle body, the top bearing arranged face up; a bottom bearing directly coupled to the knuckle assembly, the top bearing arranged face up; a top pin that rotates as the knuckle assembly moves, the top pin configured to couple the axle body to the knuckle assembly; and a bottom pin that is stationary as the knuckle assembly moves, the bottom pin configured to couple the axle body to the knuckle assembly. In a first example, the axle further comprises a steering angle sensor. In a second example that may include the first example, the axle includes where the steering angle sensor is coupled to the top pin. In a third example that may include one or both of the first and second examples, the axle includes where the axle is a steering axle. In a fourth example that may include one or more of the first through third examples, the axle further comprises a zerk fitting coupled directly to the bottom pin.

Referring now to FIG. 8, a method for a steering axle is shown. The method of FIG. 8 may be performed via a human driver of a vehicle or an autonomous driver of a vehicle in cooperation with the axle assembly shown in FIGS. 2-7. The actions that are described for the method of FIG. 8 may be actions that are taken or performed in the physical world via a human or autonomous driver.

At 802, method 800 rotates a top axle pin relative to an axle body while maintaining a bottom axle pin fixed with respect to the axle body in response to movement of a steering wheel of a vehicle. The steering wheel may be moved by a human. Alternatively, method 800 may rotate the top axle pin relative to the axle body while maintaining the bottom axle pin fixed with respect to the axle body in response to output from an autonomous controller. Method 800 proceeds to 804.

At 804, method 800 rotates a portion of a steering angle sensor as a top pin of an axle moves in response to the steering wheel moving. Method 800 proceeds to 806.

At 806, method 800 generates a steering angle position estimate via a steering angle sensor. The steering angle sensor signal may be applied via a controller to control stability of a vehicle, control engine stop/start conditions, and other vehicle functions. Method 800 Method 800 proceeds to exit.

The top bearing and the bottom bearing may be manually greased by flowing grease through a top zerk fitting. The grease flows from the top zerk fitting to a face of a top bearing. The grease flows through the face of the top bearing and out the back of the top bearing. From the back of the top bearing, the grease may flow out of the top bearings seal. Grease may also flow from a bottom zerk fitting to a face of a bottom bearing via a passage that passes through a bottom pin. The grease flows through the face of the bottom bearing and out the back of the bottom bearing. From the back of the bottom bearing, the grease may flow out of the bottom bearings seal.

Thus, method 800 provides for a method for an axle, comprising: rotating a top axle pin relative to an axle body, the top axle pin rotating with movement of a wheel knuckle; and maintaining rotation of a bottom axle pin fixed relative to the axle body as the top axle pin rotates. In a first example, the method further comprises rotating at least a portion of a steering angle sensor, the steering angle sensor coupled to the top axle pin. In a second example that may include the first example, the method further comprises generating an indication of a steering angle position via the steering angle sensor and supplying the steering angle to a controller. In a third example that may include one or both of the first and second examples, the method further comprises flowing grease through a first zerk fitting and a top tapered roller bearing. In a fourth example that may include one or more of the first through third examples, the method includes wherein the grease flows from a face side of the top tapered roller bearing to a back side of the top tapered roller bearing. In a fifth example that may include one or more of the first through fourth examples, the method further comprises flowing grease through a second zerk fitting and a bottom tapered roller bearing. In a sixth example that may include one or more of the first through fifth examples, the method includes wherein the grease flows from a face side of the bottom tapered roller bearing to a back side of the bottom tapered roller bearing. In a seventh example that may include one or more of the first through sixth examples, the method includes wherein the grease flows through a bottom axle pin, where the bottom axle pin couples a wheel knuckle to the axle body.

While various embodiments have been described above, it may be understood that they have been presented by way of example, and not limitation nor restriction. It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The technology may be used as a stand-alone, or used in combination with other power transmission systems not limited to machinery and propulsion systems for tandem axles, electric tag axles, P4 axles, HEVs, BEVs, agriculture, marine, motorcycle, recreational vehicles and on and off highway vehicles, as an example. The subject matter of the present disclosure includes all novel and non-obvious combinations and sub-combinations of the various systems and configurations, and other features, functions, and/or properties disclosed herein. It will be apparent to persons skilled in the relevant arts that the disclosed subject matter may be embodied in other specific forms without departing from the spirit of the subject matter.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the term "approximately" is construed to mean plus or minus five percent of the range, unless otherwise specified.

The invention claimed is:

1. An axle, comprising:
    an axle body;
    a steering knuckle;
    a top bearing directly coupled to the axle body;
    a bottom bearing directly coupled to the steering knuckle;
    a top pin that rotates as the steering knuckle moves, the top pin configured to couple the axle body to the steering knuckle;
    a bottom pin that is stationary as the steering knuckle moves, the bottom pin configured to couple the axle body to the steering knuckle, wherein the bottom pin is spaced away from the top pin;
    one or more shims positioned between the bottom pin and a section of an axle housing and configured to preload the top bearing and the bottom bearing, wherein the section of the axle housing is positioned vertically below the bottom bearing; and
    a top grease zerk fitting coupled directly to the axle body, wherein the top grease zerk fitting includes a grease opening that is in fluidic communication with a passage in the axle housing that is adjacent to the top bearing, wherein the grease opening in the top grease zerk fitting extends therethrough;
    wherein the top grease zerk fitting is positioned radially outward from a sensor and a magnet;
    wherein the sensor and the magnet are aligned with a rotational axis of the top pin;
    wherein the top bearing is assembled in the axle body; and
    wherein the bottom bearing is assembled in the steering knuckle.

2. The axle of claim 1, wherein the top bearing and the bottom bearing are tapered roller bearings.

3. The axle of claim 1, further comprising a steering angle sensor coupled to the axle body.

4. The axle of claim 1, further comprising a bottom grease zerk fitting coupled directly to the bottom pin, wherein the bottom grease zerk fitting includes a grease opening that is in fluidic communication with a passage that longitudinally extends through the bottom pin.

5. A method for an axle, comprising:
    rotating a top axle pin relative to an axle body, the top axle pin rotating with movement of a wheel knuckle; and
    maintaining rotation of a bottom axle pin fixed relative to the axle body as the top axle pin rotates;
    wherein the axle includes:
        the axle body;
        a steering knuckle;
        a top bearing directly coupled to the axle body;
        a bottom bearing directly coupled to the steering knuckle;
        a top pin that rotates as the steering knuckle moves, the top pin configured to couple the axle body to the steering knuckle;
        a bottom pin that is stationary as the steering knuckle moves, the bottom pin configured to couple the axle body to the steering knuckle, wherein the bottom pin spaced away from the top pin;
        one or more shims positioned between the bottom pin and a section of an axle housing and configured to preload the top bearing and the bottom bearing, wherein the section of the axle housing is positioned vertically below the bottom bearing; and
        a top grease zerk fitting coupled directly to the axle body, wherein the top grease zerk fitting includes a grease opening that is in fluidic communication with a passage in the axle housing that is adjacent to the top bearing, wherein the grease opening in the top grease zerk fitting extends therethrough;
        wherein the top grease zerk fitting is positioned radially outward from a sensor and a magnet;
        wherein the sensor and the magnet are aligned with a rotational axis of the top pin; and
        wherein the grease flows through the bottom axle pin, and wherein the bottom axle pin couples the wheel knuckle to the axle body.

6. The method of claim 5, further comprising rotating at least a portion of a steering angle sensor, the steering angle sensor coupled to the top axle pin.

7. The method of claim 6, further comprising generating an indication of a steering angle position via the steering angle sensor and supplying the steering angle position to a controller.

8. The method of claim 5, wherein the grease flows from a face side of the top tapered roller bearing to a back side of the top tapered roller bearing.

9. The method of claim 5, further comprising flowing grease through a grease opening in a second zerk fitting and a bottom tapered roller bearing.

10. The method of claim 9, wherein the grease flows from a face side of the bottom tapered roller bearing to a back side of the bottom tapered roller bearing.

11. An axle, comprising:
    an axle body;
    a steering knuckle;
    a top bearing directly coupled to the axle body, the top bearing arranged face up;
    a bottom bearing directly coupled to the steering knuckle, the top bearing arranged face up;

a top pin that rotates as the steering knuckle moves, the top pin configured to couple the axle body to the steering knuckle;

a bottom pin that is stationary as the steering knuckle moves, the bottom pin configured to couple the axle body to the steering knuckle, wherein the bottom pin spaced away from the top pin;

one or more shims positioned between the bottom pin and a section of an axle housing and configured to preload the top bearing and the bottom bearing, wherein the section of the axle housing is positioned vertically below the bottom bearing;

a top grease zerk fitting coupled directly to the axle body, wherein the top grease zerk fitting includes a grease opening that is in fluidic communication with a passage in the axle housing that is adjacent to the top bearing, wherein the grease opening in the top grease zerk fitting extends therethrough; and a bottom grease zerk fitting coupled directly to the bottom pin and including a grease opening, wherein the grease opening in the zerk fitting is in fluidic communication with a passage that extends through the bottom pin;

wherein the top grease zerk fitting is positioned radially outward from a sensor and a magnet; and wherein the sensor and the magnet are aligned with a rotational axis of the top pin.

12. The axle of claim 11, further comprising a steering angle sensor.

13. The axle of claim 12, wherein the steering angle sensor is coupled to the top pin.

14. The axle of claim 13, wherein the axle is a steering axle.

* * * * *